United States Patent [19]

Matsuda et al.

[11] Patent Number: 5,139,575
[45] Date of Patent: Aug. 18, 1992

[54] METHOD FOR PREPARING INDIGESTIBLE HETEROPOLYSACCHARIDES

[75] Inventors: Isao Matsuda, Itami; Kazuhiro Ohkuma, Sanda; Yumiko Daido, Nishinomiya; Reiji Takahashi, Itami, all of Japan

[73] Assignee: Matsutani Chemical Industries Co., Ltd., Itami, Japan

[21] Appl. No.: 634,851

[22] Filed: Dec. 27, 1990

[30] Foreign Application Priority Data

Dec. 27, 1989 [JP] Japan .................................. 1-344740

[51] Int. Cl.$^5$ .............................................. C08B 30/20
[52] U.S. Cl. ...................................... 127/23; 127/34; 127/42
[58] Field of Search ..................... 127/23, 34, 42, 46.1, 127/58

[56] References Cited

U.S. PATENT DOCUMENTS 2,563,014  8/1951  Durand ................................. 127/34
4,859,488  8/1989  Kan et al. ............................ 536/114

Primary Examiner—Theodore Morris
Assistant Examiner—P. L. Hailey
Attorney, Agent, or Firm—Armstrong & Kubovcik

[57] ABSTRACT

A process of preparing indigestible heteropolysaccharides which features dissolving starch decomposition products and at least one kind out of monosaccharides excluding glucose, homo-oligosaccharides excluding gluco-oligosaccharides, and hetero-oligosaccharides into water and to which an inorganic acid was added, then powdering and heating the powder in an anhydrous condition thereof.

5 Claims, No Drawings

METHOD FOR PREPARING INDIGESTIBLE HETEROPOLYSACCHARIDES

BACKGROUND OF THE INVENTION

The present invention relates to a method for preparing indigestible and low-caloric polysaccharides and, more particularly, to a method for preparing heteropolysaccharides preferably suited for indigestible and low-caloric edible materials.

As for the preparation of indigestible polysaccharides, the following methods have been suggested so far: the one to produce edible condensed polymers from an aqueous solution containing saccharides such as glucose or maltose, edible polycarbonic acid and/or edible polyol (Japanese Patent Publication (Examined) No.53-47280); the one to act upon starch or starch derivatives with an edible acid under a particular condition (Japanese Patent Publication (Examined) No.56-29512); and the one to heat up starch or starch hydrolyzates with sugar alcohol and an inorganic acid or organic acid in an anhydrous condition (Japanese Patent Publication No.1-12762). These polymers are generally obtained through polymerizing starch or starch hydrolyzates, saccharides such as glucose or maltose, and edible polycarbonic acid or polyol at a high temperature. Another method to utilize pyrodextrin with indigestibility has also been proposed (Japanese Patent Application No. 63-254540).

The results gained through these prior methods, however, are homopolymers mainly consisting of glucose and have a defect of being apt to be decomposed by amylase.

On the other hand, the research on hetero-oligosaccharides such as fructo-oligosaccharides, galacto-oligosaccharides, and bean oligosaccharides as low-caloric sweetening agents has lead to their commercial supply on the market place.

The inventors of the present application have directed their attention to the fact that these low-caloric oligosaccharides are of heterosaccharides and hit upon a new idea that indigestible polysaccharides may be obtained by converting starch decomposed products into heteropolysaccharides and, on the basis of this new idea, they have successfully come to develop a novel method for preparing heteropolysaccharides.

SUMMARY OF THE INVENTION

Accordingly, an object of the present invention is to materialize such a new idea as mentioned above, that is, to provide a novel method for converting homopolysaccharides obtained from starch decomposed products into heteropolysaccharides indigestible in the human body.

The foregoing object of the invention is accomplished by treating up to polymerize starch decomposition products and in which at least one kind of monosaccharides except glucose, homo-oligosaccharides except gluco-oligosaccharides, and hetero-oligosaccharides with a small amount of an inorganic acid as a catalyst.

In the present specification, the following terms have the following meanings unless otherwise specified herein:

(1) "Maltodextrins" means a general term for starch hydrolyzates in the range of 1 to 20 of DE (the abbreviation of "Dextrose Equivalent", the value representing a hydrolyzaticn degree of starch).

(2) "Corn Syrup Solid" means a general term for starch hydrolyzates powder in the range of 20 to 40 of DE.

(3) "Pyrodextrins" means a general term for the dextrins soluble partially or wholly which are obtained through heating starch alone or with a small amount of acid added as a catalyst at a temperature from 100° to 200° C.

(4) "Soluble Starch" means a starch of low molecular weight obtained through an addition of an oxidizing agent such as sodium hypochlorite to starch in an alkaline suspension condition and then an oxidation of a part of hydroxyl groups in starch.

(5) "Powdering" means a drying and powdering process by spray-drying or vacuum freeze-drying as pretreatment of preparation in order to mix starch decomposition products and other saccharides with a catalyst uniformly and to cause reaction in an anhydrous powder condition.

(6) "Homo-oligosaccharides" means a general term for combination of single monosaccharide, including starch, maltose, cellulose, and the like.

(7) "Hetero-oligosaccharides" means a general term for combination of two or more kinds of monosaccharides, including lactose, sucrose, fructo-oligosaccharide, galacto-oligosaccharide, bean oligosaccharide, and the like.

General kinds of starch obtained from potato, corn, waxy corn, sweet potato, cassaba, and the like are used as raw materials for starch decomposition products which are initial materials employed in the invention. And their DE is preferable in the range of 3 to 40. Pyrodextirn and oxidized starch can be also used.

Preferred examples of starch decomposition products are maltodextrin, corn syrup solid, pyrodextrin, and oxidized starch with DE in the range of 3 to 40. These starch decomposition products can be used singly or in combination with two or more.

The saccharides to be used in the present invention are classified as follows:
(i) monosaccharides (excluding glucose);
(ii) homo-cligosaccharides (excluding gluco oligosaccharide); and
(iii) hetero-oligosaccharides.

Glucose and gluco-oligosaccharide are excluded in the above (i) and (ii) because starch decomposition products are gluco-oligosaccharides and contain a small amount of glucose.

One kind or two kinds among the above saccharides shown in (i) to (iii) can be used together, that is, not only one kind alone among (i) to (iii) can be used, but also two or more kinds among (i) to (iii) can be used together. If using only one specific kind of saccharides belonging to (i), not only one of that kind can be used but also two or more of that kind can be used together.

The saccharides to be used may be monosaccharides such as xylose, arabinose, galactose, mannose, fructose, sorbose, and oligosaccharides such as sucrose, lactose, kestose, nitrose, lactulose, raffinose, stachinose. Moreover, other than single use of sucrose or fructose, such fructo-oligosacharides mixed with sucrose, fructose, glucose, kestose, nistose and the like, and galacto-oligosaccharides mixed with sucrose, raffinose, stachinose and the like can be also used.

Mixture ratio of sacharides to starch decomposition products is in such a wide range as 25 to 300 parts by weight. In consideration of process, however, a preferable mixture ratio of saccharides is in the range of about 25 to 50 parts by weight in case of high DE (i.e., DE over 25) and in the range of about 50 to 75 parts by weight in case of low DE.

As acid to be used as catalyst, inorganic acids including hydrochloric acid, nitric acid, phosphoric acid, etc., particularly diluted hydrochloric acid is preferable when used in an amount below 0.1%, and more preferably 0.03%. A preferable amount of 1% hydrochloric acid to be used is not more than 10%, and 5% on the average.

For carrying out the method in accordance with the invention, material mixtures are dissolved in water to prepare an aqueous solution containing 30 to 50%, preferably 40%, of the material mixtures (heating up is necessary in case of oxidized starch), then an inorganic acid is added and the solution is powdered through spray-drying, vacuum freeze-drying and so on. The powder thus obtained is then heated up at a temperature range of 100° to 200° C. for reaction and polymerization. The time spent for this process is sufficient for the polymerization. The powder of heteropolysaccharides obtained through the mentioned process is then dissolved in water, neutralized and decolorized with the use of activated charcoal, and desalted with ion-exchanger resins, powdered through spray-drying to obtain a powder of refined heteropolysaccharides.

Described hereinafter are preferred examples accompanied by experiments in accordance with the present invention.

In this respect, the indigestible ingredients disclosed in the invention were measured and analyzed in the following method, and it was acknowledged thereby that the produced ingredients were heteropolysaccharides.

Analytical Method for Content of Indigestible Ingredient

A sample of 1 g measured precisely was dissolved in 50 ml of water and whose pH was adjusted to 5.8, then 0.1 ml of alpha-amylase ("Thermamyl 120" produced by Novo Co.) was added and allowed to react at a temperature of 95° C. for 30 minutes. The solution was cooled and adjusted to pH 4.5, then 0.1 ml of amyloglucosidase (produced by Sigma Co.) was added to be allowed to react at a temperature of 60° C. for 30 minutes, and further heated up to 90° C. to complete the reaction. After these processes, the solution was filtered and condensed to 5% to be applied to HPLC (High-Performance Liquid Chromatography), whereby the amount of glucose produced from saccharides was measured. Content of the indigestible polysaccharides was obtained by the following expression:

Content of indigestible polysaccharides (%)
= 100 − (monosaccharides produced % × 0.9)

Acknowledgment Method of Heteropolysaccharides

The solution obtained was dissolved in water, and a part thereof was hydrolyzed with acid and neutralized to be placed in HPLC, and the acknowledgment of heteropolysaccharides was conducted through comparison with the composition of saccharides before the hydrolysis.

Example of experiment 1

A predetermined amount of the materials specified in Table 1 were employed for the process. The results obtained are also shown in Table 1. Note that descriptions in Table 1 respectively represent the following.

Mixing ratio is the one at dry condition (by weight).

SD indicated in drying method means spray-drying in which material mixtures were dissolved to 40% by weight, then 1% hydrochloric acid solution added by 5% to the mentioned mixtures under dry condition and dried up at an inlet-air temperature of 160° C., at an outlet-air temperature of 95° C., and at an atomizer revolution of 14000 r.p.m.

Note that the solutions No.1, No.2, No.12 were of 30% by weight.

FD indicated in drying method indicates vacuum freeze-drying method in which material mixtures were dried up at a freezing temperature of −20° C., and at a table temperature of 40° C., other conditions being the same as in SD.

| | | |
|---|---|---|
| DE5: | waxy corn starch | hydrolyzed by alpha-amylase |
| DE25: | corn starch | hydrolyzed by acid |
| DE35: | corn starch | hydrolyzed by acid |
| Dextrin: | potato starch | pyrodextrin |
| (British Gum 70E produced by Matsutani Chemicals) | | |
| Oxidized starch: | cassaba (tapioca) starch | |
| | | processed by sodium hypochlorous acid |
| (Stabilose S-10 produced by Matsutani Chemicals) | | |

Note that each of the above processes by alpha-amylase, acid heat up dextrin, and sodium hypochlorite was carried out in accordance with the following method:

Hydrolysis by alpha-amylase

2000 Kgs of waxy corn starch was dissolved in 4000 liters of water, Klaistase KD in 3 Kgs was added after being adjusted to pH 5.8 with calcium carbonate, then poured into 500 liters of hot water at a temperature of 85° C. with steam introduced therein to keep the temperature at around 85° C. After the pouring which took 15 minutes, the solution was boiled under a pressure of 1.5 Kg for 10 minutes, then gushed out under normal pressure. After cooling at about 85° C, 2 Kgs of Klaistase KD was further added to the solution, and secondary hydrolysis was carried out while keeping the temperature at 85° C. for 25 minutes. Oxalic acid was then added to the solution and adjusted to pH 4.0 so as to terminate the reaction of alpha-amylase. The solution was refined through known processes of decoloration, filtration, and by ion-exchanger resins to be condensed to 35%, and finally spray-dried to obtain powder of about 1450 Kgs.

Hydrolysis by acid (DE25)

2000 Kgs of corn starch was dissolved in 4000 liters of water, 7 Kgs of oxalic acid was added, then poured into 500 liters of hot water at a temperature of 85° C. with steam introduced therein to keep the temperature at around 85° C. After the pouring which took 25 minutes, the solution was boiled under a pressure of 1.5 Kg for 40 minutes, then gushed out under normal pressure. The pH of the solution was adjusted to 5.5 with calcium carbonate, then the solution was refined through known processes of decoloration, filtration, and by ion-exchanger resins to be condensed to 50%, and finally spray-dried to obtain powder of about 1500 Kgs.

Hydrolysis by acid (DE35)

2000 Kgs of potato starch was dissolved in 4000 liters of water, 8 Kgs of oxalic acid was added, then poured into 500 liters of hot water at a temperature of 85° C. with steam introduced therein to keep the temperature at around 85° C. After the pouring which took 25 minutes, the solution was boiled under a pressure of 1.6 Kg for 50 minutes, then gushed out under normal pressure. The pH of the solution was adjusted to 5.5 with calcium carbonate, then the solution was refined through known processes of decoloration, filtration, and by ion-exchanger resins to be condensed to 45%, and finally spray-dried to obtain powder of about 1400 Kgs.

Pyrodextrin

5000 Kgs of potato starch was put into a Ribbon Mixer, 1% hydrochloric acid in 150 liters was sprayed with stirring and uniformized through a mixer, further allowed to mature in the Ribbon-Mixer. The obtained mixture was preliminarily dried up to a condition containing 3% of water, subsequently put into a Rotary-Kiln-Type converter to be continuously heated at a temperature of 180° C. for two hours. Finally about 4000 Kgs of pyrodextrin was obtained.

Oxidation of starch

1000 Kgs of tapioca starch was dissolved in 1200 liters of water and stirred, then its pH was adjusted to 9.5 with sodium hydroxide solution, and similarly adding with sodium hydroxide solution to keep pH appropriately, and then 200 liters of sodium hypochlorite solution was poured into the above solution for two hours. The temperature kept in the range of 21° to 23° C. for it to react for 5 hours, sodium sulfite solution was added to stop the reaction, then sulfuric acid was added for neutralization. Subsequently, the mixture was washed in water in a normal method and flash-dried to be 900 Kgs of powder.

TABLE 1-1

| No | Starch Decomposition | Saccharides | Mixing Rate | Drying Method | Heating Method °C. hr |
|---|---|---|---|---|---|
| 1 | DE5 | fructose | 85:15 | SD | 140 × 1.0 |
| 2 | DE5 | sucrose | 50:50 | SD | 140 × 1.0 |
| 3 | DE5 | fructo-oligo-saccharides | 50:50 | FD | 148 × 1.0 |
| 4 | DE5 | galacto-oligo-saccharides | 70:30 | FD | 160 × 2.0 |
| 5 | DE25 | galactose | 90:10 | SD | 150 × 2.0 |
| 6 | DE25 | xylose | 50:50 | SD | 140 × 0.5 |
| 7 | DE35 | fructose | 95:5 | SD | 120 × 0.5 |
| 8 | DE35 | sucrose | 90:10 | SD | 140 × 1.0 |
| 9 | DE35 | fructo-oligo-saccharides | 80:20 | SD | 120 × 1.0 |
| 10 | DE35 |  | 70:30 | SD | 150 × 2.0 |
| 11 | dextrin | lactose | 50:50 | SD | 150 × 1.0 |
| 12 | oxidized starch | galactose | 80:20 | SD | 160 × 2.0 |

TABLE 2-2

| No. | Indigestible Product Before Processing | Indigestible Product After Processing | Average Weight |
|---|---|---|---|
| 1 | 12 | 76 | 800 |
| 2 | 12 | 71 | 1000 |
| 3 | 37 | 88 | 1200 |
| 4 | 17 | 89 | 1400 |
| 5 | 2 | 80 | 700 |
| 6 | 2 | 77 | 600 |
| 7 | 0 | 60 | 800 |
| 8 | 0 | 65 | 700 |
| 9 | 15 | 70 | 550 |
| 10 | 23 | 85 | 1000 |
| 11 | 22 | 90 | 1500 |
| 12 | 9 | 65 | 2000 |

DESCRIPTION OF THE PREFERRED EMBODIMENTS

EXAMPLE 1

A mixture of 850 gs of starch hydrolyzate of DE3.5 (Pinedex No.100 produced by Matsutani Chemicals) and 150 gs of fructose was dissolved in water to get a 40% solution, then 500 ppm of hydrochloric acid was added, and dried up with a spray-drier (at an inlet air temperature of 160° C., an outlet air temperature of 95° C., and atomizer speed at 14000 r.p.m.).

Subsequently, 500 gs of the powder obtained through the above was placed in an aluminum vat and heated in an oven in order at a temperature of 100° C. for 30 minutes, at a temperature of 140° C. for 30 minutes, and at a temperature of 160° C. for 30 minutes, respectively.

The powder obtained in the above process was then dissolved in water and neutralized with sodium hydroxide, decolorized with activated charcoal, then desalted with ion-exchanger resins and finally spray-dried to obtain 450g of powder. Properties of this powder were as follows:

| | |
|---|---|
| Average molecular weight | 5500 |
| Decomposition ratio of pancreatin | 8.5% |
| Indigestible portion | 75.8% |

EXAMPLE 2

A mixture of 500 gs of starch hydrolyzate of DE8.0 (Pinedex No.100 produced by Matsutani Chemicals) and 500 gs of sugar was dissolved in water to be a 40% solution, then 300 ppm of hydrochloric acid was added, and dried up with a freeze-drier (at an inlet air temperature of −20° C., a table temperature of 40° C.).

Subsequently, 500 gs of the powder obtained through the above was ground and placed in an aluminum vat and heated in an oven in order at a temperature of 140° C. for 30 minutes.

The powder obtained in the above process was then dissolved in water and neutralized with sodium hydroxide, decolorized with activated charcoal, then desalted with ion-exchanger resins and finally spray-dried to obtain 400g of powder. Properties of this powder were as follows:

| | |
|---|---|
| Average molecular weight | 8000 |
| Decomposition ratio of pancreatin | 7.7% |
| Decomposition ratio of invertase | 1.3% |
| Indigestible portion | 62.8% |

EXAMPLE 3

A mixture of 2000 Kgs of starch hydrolyzate of DE3.5 (Pinedex No.1 produced by Matsutani Chemicals) and 2000 Kgs of lactose was dissolved in water to be a 40% solution, then 500 ppm of hydrochloric acid was added, and dried up with a spray-dryer (with an inlet air temperature of 170° C., an outlet air temperature of 90° C., and an atomizer speed at 4500 r.p.m.). Then 3900 Kgs of the obtained powder was placed in a Rotary-Kilin-Type converter and continuously heated at a temperature of 160° C. for one hour and a half.

The powder obtained in the above process was then dissolved in water and neutralized with sodium hydroxide, decolorized with activated charcoal, then desalted with ion-exchanger resins and finally spray-dried to be 3000 Kgs of powder. Properties of this powder were as follows:

| Average molecular weight | 3500 |
|---|---|
| Decomposition ratio of pancreatin | 5.2% |
| Decomposition ratio of invertase | 1.2% |
| Indigestible portion | 87.8% |

EXAMPLE 4

A mixture of 800 gs of starch hydrolyzate of DE39 (Pinedex No.100 produced by Matsutani Chemicals) and 200 gs of xylose was dissolved in water to be a 45% solution, then 400 ppm of hydrochloric acid was added, and dried up in the same method as in Example 1.

Subsequently, 800 gs of the obtained powder was put in an aluminum vat and heated in an oven at a temperature of 130° C. for 25 minutes.

The powder obtained in the above process was then dissolved in water and neutralized with sodium hydroxide, decolorized with activated charcoal, then desalted with ion-exchanger resins and finally spray-dried to obtain 650 gs of powder. Properties of this powder were as follows:

| Average molecular weight | 520 |
|---|---|
| Decomposition ratio of pancreatin | 4.5% |
| Decomposition ratio of invertase | 0.8% |
| Indigestible portion | 88.4% |

EXAMPLE 5

A mixture of 600 gs of pyrodextrin (Arabix No.6 produced by Matsutani Chemicals) and 400 gs of galactose was dissolved in water to be a 50% solution, then 500 ppm of hydrochloric acid was added, and dried up in the same method as in Example 2.

Subsequently, 850 gs of the powder obtained was put in an aluminum vat and heated in an oven at a temperature of 150° C. for 40 minutes.

The powder obtained in the above process was then dissolved in water and neutralized with sodium hydroxide, decolorized with activated charcoal, then desalted with ion-exchanger resins and finally spray-dried to obtain 650 gs of powder. Properties of this powder were as follows:

| Average molecular weight | 1600 |
|---|---|
| Decomposition ratio of pancreatin | 3.5% |
| Decomposition ratio of invertase | 0.7% |
| Indigestible portion | 90.5% |

EXAMPLE 6

A mixture of 750 gs of oxidized starch (Stabilose S-10 produced by Matsutani Chemicals) and 250 gs of lactose was dissolved in water to be a 40% solution, then 350 ppm of hydrochloric acid was added, and dried up in the same method as in Example 2.

Subsequently, 750 gs of the powder obtained was put in an aluminum vat and heated in an oven at a temperature of 180° C. for 40 minutes.

The powder obtained in the above process was then dissolved in water and neutralized with sodium hydroxide, decolorized with activated charcoal, then desalted with ion-exchanger resins and finally spray-dried to obtain 600 gs of powder. Properties of this powder were as follows:

| Average molecular weight | 2100 |
|---|---|
| Decomposition ratio of pancreatin | 7.7% |
| Decomposition ratio of invertase | 1.1% |
| Indigestible portion | 80.4% |

Note that the analyzing methods employed in the preferred Examples 1 to 6 were as follows.

Also note that the starch decomposition products employed in the preferred Examples 1 to 6 were respectively produced in the following manner.

Pinedex No.100

Produced in the same condition as for hydrolysis by alpha-amylase (DE5) employed in Example 1 of Experiment except that the time of secondary hydrolysis was changed to 18 minutes.

Pinedex No.1

Produced in the same condition as for hydrolysis by alpha amylase (DE5) employed in Example 1 of Experiment except that the material was corn starch and that the amount of Klaistase KD was changed to 4 Kgs, and the time to 30 minutes.

Pinedex No.6

Produced in the same condition as for hydrolysis by acid (DE5) employed in Example 1 of Experiment except that the time for boiling was changed to 60 minutes.

Arabix No.7

Produced in the same condition as for Pyrodextrin by acid (DE5) employed in Example 1 of Experiment except that the temperature for heating was changed to 170° C.

Decomposition ratio of pancreatin

The same was made to a 10% solution, and at pH 6.5 at a temperature of 37° C., 1% by solid basis of pancreatin (produced by Ishizu Co.) was added to it, and the digestion was conducted for 10 hours, finally the decomposition ratio was expressed by the following equation:

$$\text{Decomposition ratio} = \frac{\text{(reducing sugars after decomposition)} - \text{(reducing sugars before decomposition)}}{\text{Total solid before decomposition}} \times 100$$

Decomposition ratio of lactase

The sample to a 10% solution, and at pH 7.3 at a temperature of 37° C., 1% by solid basis of $\beta$-galactocidase (produced by Sigma Co.) was added to it, and the digestion was conducted for 10 hours, finally the decomposition ratio was estimated by the following equation:

Decomposition ratio =

$$\frac{\text{(reducing sugars after decomposition)} - \text{(reducing sugars before decomposition)}}{\text{Total solid before decomposition}} \times 100$$

Decomposition ratio of invertase

The same was made to a 10% solution, and at pH 4.0 at a temperature of 20° C., 1% by solid basis of invertase (produced by Wako Junyaku Co.) was added to it, and the digestion was conducted for 10 hours, finally the decomposition ratio was obtained through the following equation:

$$\frac{\text{(reducing sugars after decomposition)} - \text{(reducing sugars before decomposition)}}{\text{Total solid before decomposition}} \times 100$$

What is claimed is:

1. A process of preparing indigestible heteropolysaccharides comprising the steps of:

(a) preparing a mixture comprising (1) at least one starch decomposition product, (2) at least one saccharide selected from the group consisting of monosaccharide, homo-oligosaccharide and hetero-oligosaccharide and (3) an inorganic acid in water; said monosaccharide being other than glucose and said homo-oligopolysaccharide being other than gluco-oligosaccharide;

(b) powdering and dehydrating said mixture to obtain a powder in a substantially anhydrous form;

(c) and heating said powder at a temperature range of 100° to 200° C. to cause polymerization.

2. A process according to claim 1, wherein said starch decomposition products are selected from the group consisting of maltodextrin, corn syrup solid of DE-3~40, pyrodextrin and oxidized starch.

3. A process according to claim 1, wherein said monosaccharide is selected from the group consisting of a pentose and a hexose.

4. A process according to claim 1, wherein said hetero-oligosaccharide is selected from the group consisting of sucrose, lactose, kestose, nistose, lactulose, raffinose and stachlose.

5. A process according to claim 1, wherein the ratio of starch decomposition products to said saccharide is in the range of 1:99 to 99:1.

* * * * *